United States Patent [19]

Cobb

[11] Patent Number: 5,326,394
[45] Date of Patent: Jul. 5, 1994

[54] OIL BASED PAINT

[76] Inventor: James C. Cobb, 34 Crawford Rd., Mt. Kuringai, New South Wales, Australia 2080

[21] Appl. No.: 967,875

[22] Filed: Oct. 28, 1992

Related U.S. Application Data

[63] Continuation-in-part of Ser. No. 538,373, Jun. 15, 1990, abandoned.

[30] Foreign Application Priority Data

Jun. 15, 1989 [AU] Australia .................. PJ4736
Oct. 23, 1989 [AU] Australia .................. PJ6993

[51] Int. Cl.$^5$ .................................... C11C 3/00
[52] U.S. Cl. ...................... 106/504; 106/222; 106/228; 106/252; 106/253; 524/313; 524/322
[58] Field of Search ........... 106/253, 228, 252, 222, 106/504; 524/313, 322

[56] References Cited

U.S. PATENT DOCUMENTS

| | | | |
|---|---|---|---|
| 3,386,934 | 6/1968 | Aguadisch et al. | 524/313 |
| 4,719,254 | 1/1988 | Levine | 106/252 |
| 4,997,480 | 3/1991 | Rao | 524/313 |

FOREIGN PATENT DOCUMENTS

| | | |
|---|---|---|
| 016536 | 2/1977 | Japan . |
| 006763 | 1/1985 | Japan . |
| 065075 | 4/1985 | Japan . |
| 891728 | 12/1981 | U.S.S.R. . |

OTHER PUBLICATIONS

The Condensed Chemical Dictionary, 11th Edition, Revised by Gessner, G. Hawley, p. 18, 1987.
*Chemistry of Organic Compounds*, by Carl R. Noller, Second Edition, p. 187, 1964.

Primary Examiner—Mark L. Bell
Assistant Examiner—Scott L. Hertzog
Attorney, Agent, or Firm—Nixon & Vanderhye

[57] ABSTRACT

An oil based artist paint composition is disclosed in which a polymeric plasticizer is included that acts to circumvent embrittlement of a dried paint film on ageing. The invention has particular application to artists' paint compositions that are linseed oil based. A preferred plasticizer is poly butyl acrylate.

In a preferred embodiment, alkyd resins are included in the composition to reduce the tendency of paint films to shrink on ageing and "creep" when used in very heavy impasto applications.

18 Claims, No Drawings

OIL BASED PAINT

This is a continuation-in-part of application Ser. No. 07/538,373, filed Jun. 15, 1990, abandoned.

FIELD OF THE INVENTION

This invention relates to artist paints and more particularly to an improved linseed oil-based artist paint and a medium therefor.

BACKGROUND TO THE INVENTION

Traditional artist paints are oil-based wherein the oil is generally linseed oil. Such paints have been in use for at least the past three centuries and continue to retain popularity. Oil-based paints are often used in conjunction with a medium which allows the artist to adjust the rheology of the paint and adjust the pigment/binder ratio.

It has long been recognised that whilst linseed oil-based artist paints have many desirable properties, in use they suffer from two defects.

The first defect is a tendency to yellow. This has been found to be controllable within acceptable limits by a careful formulation.

The second and most serious defect is that of an uncontrollable tendency to become brittle with age. It is understood that this embrittlement is caused by continued oxidative polymerisation of the linseed oil, a process which cannot be arrested at any desired stage of "cure". This defect is particularly acute in both large and thickly painted oil paintings.

In order to circumvent these defects, the prior art has provided acrylic artist paints. It is notable that acrylic paints have achieved considerable popularity and that these paints do not suffer from the two defects of linseed oil-based artist paints. However, acrylic paint does not possess the "feel" of traditional oil-based artist paints. For that reason these paints are not generally used by "serious" artists.

Other attempts at meeting the embrittlement defect have been based on discovering formulations that were used by the various "oil masters". None of these attempts, to the present inventor's knowledge, have proved satisfactory.

Two other problems encountered in the use of artists' oil paints are shrinkage and "creep". Ageing oil paint films shrink as they age, and at a time in their ageing cycle when they are already too brittle to accommodate such movement without cracking.

"Creep" results, for example, in very heavy impasto applications of paint which often shrink and move about while the underlayers are still wet, causing the surface to crinkle.

SUMMARY OF THE INVENTION

The present inventor has recognised that there exists a need for a linseed oil or other oil based artist paint that will not only have the right "feel" but will not embrittle on aging, or suffer from shrinkage or where applicable, "creep".

To meet the need to reduce embrittlement, the inventor proposes the introduction of an agent or agents into the paint that will act to plasticise the oil permanently.

It follows that mediums for use with such a paint are also required and hence such mediums will also incorporate the requisite oil plasticiser.

Accordingly, a first aspect of the present invention consists in an improved oil-based artist paint composition which includes an oil, a pigment and an extender, the composition also including an amount of a polymer compound effective to plasticise said composition such that the weight ratio of said plasticiser compound to oil varies according to the oil absorbancy of said pigment and is in the range of from 7:93 to 33.3:100.

In a second aspect, the present invention further consists in a medium composition for use with oil-based artist paint comprising:

a solvent;

at least one alkyd resin which is thixotropic and is present in an amount effective to aid through drying of the oil in said paint; and a polymer compound effective to plasticise said paint and in an amount such that when the medium is used with said paint, the weight ratio of said plasticiser compound to oil will be in the ratio of from 7:93 to 33.3:100;

said composition having a resin solids content of from 33 to 60.9%.

It will be recognized by those skilled in the art that the mediums of the invention may also be used with a traditional linseed oil-based artist paint, to impart the beneficial properties of the invention thereto.

Although the present invention is useful for a variety of oil-based paints, it is preferred that the oil is selected from sunflower, safflower, soya, rape seed, cottonseed and linseed oils. Particularly preferred is linseed oil where the colour of the paint composition will not be adversely affected by the yellowing or darkening of the linseed oil with time. In those paint compositions that are light in colour, sunflower oil or safflower oil are preferred.

The present inventor believes that a selection of plasticiser and inclusion at an appropriate level in the paint and/or medium will produce paintings, the paint film of which when aged will contain sufficient soft polymer to ensure that film integrity and a degree of pliability are maintained.

Many soft polymers are potentially satisfactory for use in the inventive compositions however, in selecting suitable polymers, it will be recognised that the polymer must have the following properties:

1) A great degree of flexibility which remains unaltered by aging indoors. It is noted that the greater the flexibility, the smaller the addition required.
2) Non-yellowing.
3) Compatible with raw linseed oil and solvents that are mixed with linseed oil.
4) Unaffected by any of the constituents of the linseed oil per se (acid free).

DESCRIPTION OF THE INVENTION

In the paint composition of the present invention, two polymers that have been found to perform satisfactorily as plasticisers are poly butyl acrylate and polyvinyl chloride isobutylether copolymer. Various commercial polymers of these types are available. Lower viscosity grades are preferred as more of these softer polymers may be introduced to achieve the required effect. Suitable plasticizers are available from BASF under the trade names Acronal 4F. and Laroflex MP, respectively. Acronal 4F is most preferred since the Laroflex is somewhat viscous.

Other polymeric plasticisers that are operable are, for example, epoxidized oils such as Paraplex G62, available from Rohm & Haas.

Another group of suitable polymeric plasticisers are the polyesters. These plasticisers have the advantage of being less viscous, for example poly butyl acrylate, and therefore may be used in greater concentration. This is important since in general terms the maximum amount of plasticiser possible should be included in the composition which is consistent with satisfactory handling/manipulation properties and does not produce a paint film which in the dry state exhibits signs of surface tack. Suitable polyester plasticizers include medium viscosity polymers based on glycols and dibasic organic acids.

The common monomeric plasticisers are not recommended as over a time frame of say ten years, volatilisation would lead to their loss, thereby resulting in embrittlement and shrinkage of the oil paint film.

It would appear that a ratio of up to 33.3% polymer to 80% oil, particularly linseed oil, is possible without noticeably altering the "feel" of the paint. It is to be expected that the desired improvement in film characteristics should be achieved with polymer ratios of 7-33.3%.

To meet the shrinkage and "creep" problems a non-yellowing thermoplastic resin may be included in the inventive paint composition, preferably with at least one alkyd resin. Desirably, the at least one alkyd resin will be thixotropic and will act to aid in the through drying of the oil and maintain "balance" in handling properties. A second alkyd resin may be advantageously included to aid in the through drying of the oil.

One non-yellowing thermoplastic resin that has been found suitable is Laropal A81, which is available from BASF. Laropal A81 is a condensation product of urea and aliphatic aldehydes. Other thermoplastic resins such as suitable ketone aldehyde resins may also be used.

Two alkyd resins that have been found suitable are Jordathix and Jordasol, both of which are available from Ashland Chemicals. Jordasol is a 75% oil length soya oil isophthalic alkyd of 70% solids whilst Jordathix is a 50% oil length soya/tall oil thixotropic modified alkyd of 40% solids.

Without wishing to be bound by theory, the present inventor believes that the presence of an alkyd resin triggers the drying process with the oils used. By selection and combination of two alkyd resins and by appropriately formulating the other components of a paint composition of the invention, the characteristics of the paint will be such that its handling properties will appear entirely conventional. Additionally, the slower drying sunflower or safflower oils can be made to dry at much the same speed as linseed oil.

In order to more fully appreciate the nature of the invention, several examples of typical paint compositions of the invention are set out below.

The examples show the formulation of a number of different pigment types:
titanium white
burnt umber
red oxide
phthalo blue Burnt umber is an inherently thixotropic pigment with a high oil demand.

Red oxide is a characteristically strong inorganic pigment requiring an intermediate level of extender.

Phthalo blue is an organic pigment with a requirement for a high level of extender.

In addition, two extenders are exemplified, kaolin with a high oil demand and calcite with a low oil demand.

EXAMPLE 1

| Titanium White | |
|---|---|
| Ingredient | Parts by weight |
| Pigment | 300 |
| Laropal (50%) | 200 |
| *Jordathix 4040 (40%) | 130 |
| **Iso-Jordasol 2680 (70%) | 100 |
| Sunflower oil | 150 |
| Swelling clay | 80 |
| Clacite | 450 |
| Acronal 4F | 80 |

*soya/tall medium oil thixotropic alkyd resin
**soya long oil pentaerythritol modified alkyd resin incorporating isophthalic acid as the dibasic acid component.

EXAMPLE 2

| Red Oxide | |
|---|---|
| Ingredient | Parts by weight |
| Pigment | 200 |
| Laropal (50%) | 270 |
| Linseed oil | 220 |
| *Jordathix 4040 (40%) | 120 |
| **Iso-Jordasol 2680 (70%) | 50 |
| Acronal 4F | 80 |
| Kaolin | 250 |
| Swelling clay | 100 |

EXAMPLE 3

| Burnt Umber | |
|---|---|
| Ingredient | Parts by weight |
| Pigment | 375 |
| Laropal (50%) | 250 |
| *Jordathix 4040 (40%) | 120 |
| **Iso-Jordasol 2680 (70%) | 50 |
| Acronal 4F | 80 |
| Linseed oil | 250 |
| Swelling clay | 70 |
| Calcite | 250 |

EXAMPLE 4

| Beta Phthalo Blue | |
|---|---|
| Ingredient | Parts by weight |
| Pigment | 60 |
| Laropal (50%) | 281 |
| *Jordathix 4040 (40%) | 100 |
| **Iso-Jordasol 2680 (70%) | 50 |
| Linseed oil | 200 |
| Swelling clay | 85 |
| Acronal 4F | 80 |
| Kaolin clay | 300 |

EXAMPLE 5

| Titanium White | |
|---|---|
| Ingredient | Parts by weight |
| Pigment | 70 |
| **Iso-Jordasol 2680 (70%) | 20 |
| Laropal (50%) | 30 |
| Re-plas 195 | 20 |

-continued

| Titanium White | |
|---|---|
| Ingredient | Parts by weight |
| Sunflower oil | 45 |
| Swelling clay | 12 |
| Kaolin | 30 |
| Jordathix 4040 (40%) | 15 |

(Re-plas 195 is a medium viscosity polymeric plasticizer based on glycols and dibasic acid available from Townsend Chemicals Pty Ltd).

To each of these compositions may be added other ingredients well known in the art such as dispersants and viscosity modifiers. Further ingredients well known in the art such as drying agents, will be included in the paint compositions at a level appropriate to the compositions.

To prepare Examples 1-3 and 5, the swelling clay is dispersed in the Laropal, Jordathix and Jordasol. The requisite pigment and oil is then added followed by the Acronal 4F and the calcite or kaolin. Drying agents and other minor ingredients are then mixed into the composition as appropriate.

To prepare Example 4, a premix of the pigment is made with the Laropal. The premix is added to the remaining ingredients after they have been suitably mixed. Drying agents and other minor ingredients may be mixed into the composition as appropriate.

It should be noted that the ratio of the liquid components of these examples may be considerably varied. For example, to achieve a satisfactory rheology, the thixotropic Jordathix and low viscosity Laropal solutions, at high concentration, are "balanced out". The Acronal and Jordasol which both have high viscosity need to be compensated for by the Laropal and Jordathix.

In the medium composition of the present invention, polymers that have been found to be satisfactory are polyvinyl chloride isobutyl ether copolymer (Laroflex MP25), poly butyl acrylate (Acronal 4F), epoxidised oil (available from Rohm and Haas under the trade name Paraplex G62) and polyesters. These have been previously described.

It is noted that prior art mediums are commonly oleo resinous blends in a solvent, having 20-40% solids, according to the artist's preference. The proportion of oil to resin determines the oiliness of the "feel", the higher the proportion of oil, the oiler, less tacky is the "feel".

In a medium composition of the present invention the plasticising polymer may be used in place of part or all of the resinous component in an oleo resinous blend. It is noted that Laroflex MP25 may be used without an oil component.

By way of example, a typical medium composition comprises polyvinyl chloride isobutyl ether copolymer in a solvent, having approximately 30% solids. The formulation is prepared by methods well known in the art.

The medium composition of the present invention is suitable for use with oil-based artist paints.

Alkyd resins are used where paint is to be applied thickly. Without the addition of alkyd resins, where paint is applied thickly the paint film will dry on the surface while remaining soft underneath. Movement of the soft underlayer may cause wrinkling of the surface. Inclusion of an alkyd resin allows the paint to set after application.

A non-yellowing thermoplastic resin may also be included in an amount of about 300-500 parts by weight as described previously.

In order to better understand the nature of the medium composition of the invention, set out below are three examples.

EXAMPLE 1

Fat Gel

| Ingredient | Parts by weight | Resin Solids |
|---|---|---|
| *Jordathix 4040 (40%) | 400 | 280 |
| **Iso-Jordasol 2680 (70%) | 200 | 80 |
| Turpentine | 100 | |
| Acronal 4F (10% solids) | 36 | |

This is a syrupy medium for glazing at 51% solids.

EXAMPLE 2

Heavy Gel

| Ingredient | Parts by weight | Resin Solids |
|---|---|---|
| *Jordathix 4040 (40%) | 600 | 420 |
| **Iso-Jordasol 2680 (70%) | 200 | 80 |
| Laropal (50%) | 400 | 200 |
| Swelling clay | 160 | |
| Acronal 4F and drying agents | 80 | 80 |

This composition has a paste consistency suitable for impasto techniques and a solids content of 60.9%.

EXAMPLE 3

Lean Liquid Gel

| Ingredient | Parts by weight |
|---|---|
| *Jordathix 4040 (40%) | 300 |
| **Iso-Jordasol 2680 (70%) | 300 |
| Turpentine | 450 |
| Acronal 4F 10% and drying agents | 33 |

This is a main medium used to dilute paint and has a solids content of 33%.

Although the invention has been described with reference to certain preferred embodiments and examples, the person skilled in the art will appreciate that numerous variations and modifications may be made to the invention without departing from the spirit or scope thereof as broadly described.

I claim:

1. An improved oil-based artist paint composition exhibiting reduced embrittlement on aging, said composition comprising:
   an oil selected from the group consisting of linseed oil, rape seed oil, soya, cottonseed, sunflower oil and safflower oil,
   a pigment,
   an extender, and
   a polymeric plasticizer compound selected from the group consisting of an acrylate polymer or copolymer, a soft resin copolymer, an epoxidized oil and a polyester, said polymeric plasticizer compound being present in an amount effective to plasticize said composition such that the weight ratio of said polymeric plasticizer compound to oil varies according to the oil absorbency of said pigment and is in the range of from 7:93 to 33.3:100.

2. A paint composition as in claim 1, wherein the plasticizer is an epoxidized oil or a polyester.

3. A paint composition as in claim 1 including a non-yellowing thermoplastic resin in an amount effective to reduce both creep of heavy impasto applications and shrinkage of aged films of said composition.

4. A paint composition as in claim 1 including at least one alkyd resin which is thixotropic and is present in an amount effective to aid through drying of the oil.

5. A paint composition as in claim 4 in which the composition contains two alkyd resins, one of which is thixotropic and both are present in amounts effective to aid through drying of the oil.

6. A paint composition as in claim 5 wherein the thixotropic alkyd resin is present in an amount of from 40–52 parts by weight and the other alkyd resin is present in an amount of from 35–70 parts by weight.

7. A paint composition as in claim 3 wherein the non-yellowing thermoplastic resin is present in an amount of from 100 to 140.5 parts by weight.

8. A paint composition as in claim 7 wherein the oil is linseed oil.

9. A paint composition as in claim 8 wherein the plasticiser is an epoxidized oil.

10. A paint composition as in claim 9 wherein the epoxidized oil is present in an amount of 80 parts by weight.

11. A medium composition for use with an oil-based artist paint comprising:
   a solvent;
   at least one alkyd resin which is thixotropic and is present in an amount effective to aid through drying of oil in an oil-based artist paint; and
   a polymeric plasticizer compound selected from the group consisting of an acrylate polymer or copolymer, a soft resin copolymer, an epoxidized oil and a polyester, effective to plasticize an oil-based artist paint and in an amount such that when the medium composition is used with an oil-based artist paint, the weight ratio of said polymeric plasticizer compound to oil will be in the ratio of 7:93 to 33.3:100;
   said medium composition having a resin solids content of from 33 to 60.9%.

12. A medium composition as in claim 11 wherein the plasticiser is an epoxidised oil or a polyester.

13. A medium composition as in claim 12 including two alkyd resins, one of which is thixotropic and both are in amounts effective to aid through drying of the oil in said paint.

14. A medium composition as in claim 13 including a non-yellowing thermoplastic resin in an amount effective to reduce both creep of heavy impasto applications and shrinkage of aged films of said paint.

15. A medium composition as in claim 14 wherein the thixotropic alkyd resin is present in an amount of from 80–120 parts by weight and the other alkyd resin is in an amount of from 210–420 parts by weight.

16. A medium composition as in claim 15 wherein the non-yellowing thermoplastic resin is present in an amount of about 300–500 parts by weight.

17. A medium composition as in claim 16 wherein the plasticiser is present in an amount of from 33 to 80 parts by weight.

18. A medium composition as in claim 17 wherein the plasticiser is an epoxidized oil.

* * * * *